(12) United States Patent
Saccomanno

(10) Patent No.: US 6,895,164 B2
(45) Date of Patent: May 17, 2005

(54) HOLLOW WEDGE SHAPED LIGHT GUIDE

(75) Inventor: Robert J. Saccomanno, Montville, NJ (US)

(73) Assignee: Honeywell International Inc., Morristown, NJ (US)

( * ) Notice: Subject to any disclaimer, the term of this patent is extended or adjusted under 35 U.S.C. 154(b) by 189 days.

(21) Appl. No.: 10/284,838

(22) Filed: Oct. 30, 2002

(65) Prior Publication Data

US 2003/0086680 A1 May 8, 2003

Related U.S. Application Data

(60) Provisional application No. 60/336,350, filed on Nov. 2, 2001.

(51) Int. Cl.[7] ................................................. G02B 6/10
(52) U.S. Cl. ...................... 385/146; 385/133; 362/551
(58) Field of Search ............................... 385/122–133, 385/146; 362/551

(56) References Cited

U.S. PATENT DOCUMENTS

| | | | | |
|---|---|---|---|---|
| 3,939,439 A | * | 2/1976 | Fletcher et al. ............... | 372/96 |
| 4,068,920 A | * | 1/1978 | Bass et al. ................... | 385/125 |
| 4,542,449 A | | 9/1985 | Whitehead | |
| 4,688,893 A | * | 8/1987 | Laakmann ................... | 385/125 |
| 4,750,798 A | * | 6/1988 | Whitehead ................... | 385/133 |
| 4,763,398 A | * | 8/1988 | Huizing et al. ............. | 29/527.1 |
| 4,984,144 A | * | 1/1991 | Cobb et al. .................. | 362/339 |
| 5,190,370 A | * | 3/1993 | Miller et al. ................ | 362/340 |
| 5,303,322 A | * | 4/1994 | Winston et al. ............. | 385/146 |
| 5,381,309 A | * | 1/1995 | Borchardt .................... | 362/31 |
| 5,600,740 A | * | 2/1997 | Asfar .......................... | 385/27 |
| 5,664,862 A | * | 9/1997 | Redmond et al. ............. | 362/31 |
| 5,771,328 A | * | 6/1998 | Wortman et al. ........... | 385/146 |
| 5,835,661 A | * | 11/1998 | Tai et al. ..................... | 385/146 |
| 6,024,462 A | * | 2/2000 | Whitehead ................... | 362/31 |
| 6,185,357 B1 | * | 2/2001 | Zou et al. .................... | 385/133 |
| 6,633,722 B1 | * | 10/2003 | Kohara et al. .............. | 385/146 |

FOREIGN PATENT DOCUMENTS

| JP | 09-015595 A | 1/1997 |
|---|---|---|
| WO | WO 00 16006 A | 3/2000 |

\* cited by examiner

*Primary Examiner*—Ellen E. Kim
(74) *Attorney, Agent, or Firm*—Kurt Luther; James W. Falk

(57) ABSTRACT

A wedge shaped hollow light guide includes a top planar surface (100) with total internal reflecting features (11) and a bottom planar surface (20) with clocked reflective light extraction features (21).

4 Claims, 11 Drawing Sheets

Spot Diagram of Extracted Ray Intercepts on Detector

HOLLOW WEDGE SHAPED LIGHT GUIDE

This application is related to Provisional Application Ser. No. 60/336,350, filed Nov. 2, 2000.

BACKGROUND OF THE INVENTION

1. Technical Field

This invention relates to uniformly distributing collimated light for information display, illumination, and direct lighting applications.

2. Background Art

Present light waveguides, such as those used in personal computers are manufactured from a solid material such as plastic.

SUMMARY OF THE INVENTION

The present invention is a wedge shaped hollow edge-lighted waveguide based on a modular construction technique. This waveguide uses air instead of refractive media. The waveguide is built from optical films that are similar to those commercially available (either sheets or rolls) and can be cut to size to accommodate various display geometries.

Figure 1:
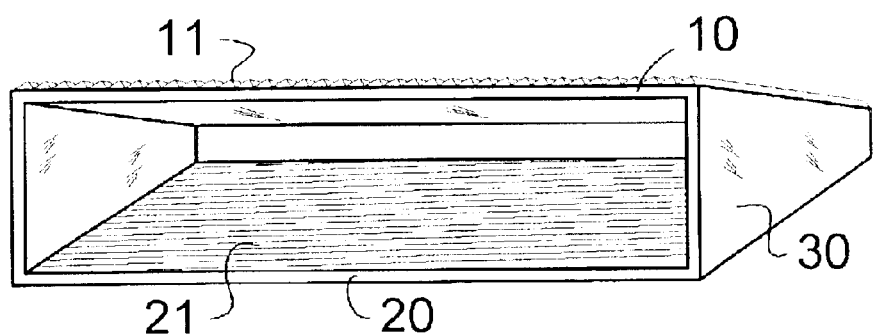
FIG. 1 is a front view of a wedge shaped hollow light guide in accordance with my invention.
Figure 2:
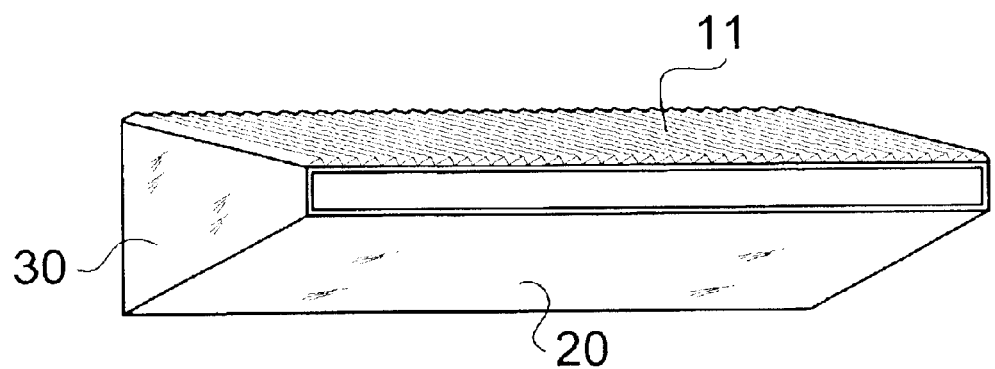
FIG. 2 is a rear view of the wedge shaped hollow light guide of FIG. 1.

List of Reference Numbers for the Major Elements in the Drawing

The following is a list of the major elements in the drawings in numerical order.

| | |
|---|---|
| 5 | conical angle (of light ray) |
| 10 | top planar sheet |
| 11 | total internal reflecting features (top planar sheet) |
| 20 | bottom planar sheet |
| 21 | reflective light extraction features |
| 100 | bottom surface |

DESCRIPTION OF THE INVENTION

Mode(s) for Carrying Out the Invention

Referring first to FIG. 1, a hollow wedge-shaped light guide is formed from a top planar surface 10 and a sloping bottom planar surface 20. The bottom planar surface 20 includes reflective light extraction features 21, which are arranged as a terrace. Advantageously, these terraced extraction features minimize light decollimation effects. The side surfaces 30 of the wedge shaped hollow light guide are specular reflectors.

The light extraction surfaces 21 of the wedge-shaped waveguide are "clocked" around an axis normal to the light exit plane, where the light exit plane corresponds to the inner surface of top planar sheet 10. I have discovered that a 'clocking angle', where the extraction features of a light guide are tilted relative to the input aperture, and rotated (or 'clocked') about the normal to the exit aperture is required for a practical hollow wedge shaped light guide in order to deflect the light at preferred angles.

The light input face is a simple rectangular aperture, defined by top planar sheet 10, bottom planar sheet 20, and specular side surfaces 30.

The top planar sheet further comprises a top surface having total internal reflecting features 11. In one embodiment of my invention, these total internal reflecting features 11 are formed from a total internal reflection (TIR) film as taught, for example, by Whitehead (U.S. Pat. No. 4,260,22). In certain embodiments of my invention, the total internal reflecting features 11 are substantially less transparent than the bulk material of said top planar sheet 10.

The top planar sheet 10 structure comprises a transparent structural member supporting one or more films. Films are supported by such techniques as surface lamination or edge fastening. In the case of most transmissive microstuctured films, an air gap must be maintained to ensure proper optical performance. Examples of structural members are optical grade plastic sheet stock, such as those from Ineos Acrylics (Lucite® and Perspex™), ATOFINA Chemicals (Plexiglas® and Tuffak®), GE (Lexan®) and non-birefingent polymers as referenced in this Specification. Also available are glass support structures, such as Corning borosilicate glasses utilized in the manufacture of liquid crystal displays (types 7059, 1737, and EAGLE2000). The plastic sheet offers very good optical clarity, low cost and the ability to withstand more flexure than glass. The glass sheet offers better optical qualities, plus high temperature performance for the application of a variety of functional coatings.

The sidewalls 30 are opposing, parallel specular reflectors. They may for example, be fabricated from Silverlux, manufactured by the 3M Corporation. Non-optical structural members can support these films, using standard pressure sensitive adhesives, such as those produced by 3M, Nittodenko or Adhesives Research. The supporting members and are located on the non-illuminated side of the reflector. For certain embodiments, the sidewalls 30 are made of optically clear materials, which are coated with a reflective material such as silver or aluminum to from a specular reflector right on the structural member.

Figure 3:
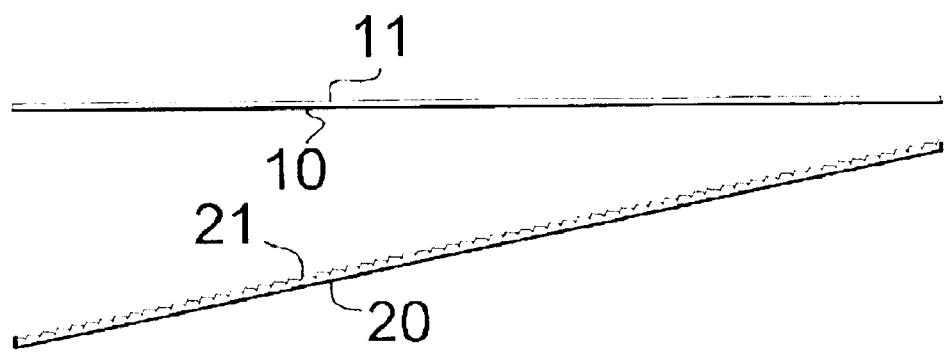
FIG. 3 is a cross-section view of the wedge shaped hollow light guide of FIG. 1.

Referring now to FIG. 3, light that enters the input rectangular aperture reflects off the reflective surface of bottom planar sheet 20 or the TIR features 11, until such time that a ray strikes a clocked extraction feature 21. Due to the clocking on the lower extraction film, light is directed off-normal to the TIR film, in order to correct for the tilt that the TIR film would provide to a ray normal to its planar surface and striking its "tread face" (i.e. each stepped feature is comprised of a tread face and a smaller riser face, using the terms from the construction industry related to stair-steps). Due to the riser face of the stepped features on the TIR film, a small percentage of light will form a "ghost image" at a non-desired angle. In certain embodiments, blackening and/or minimizing the height of the riser face eliminates the ghosting.

Figure 4:
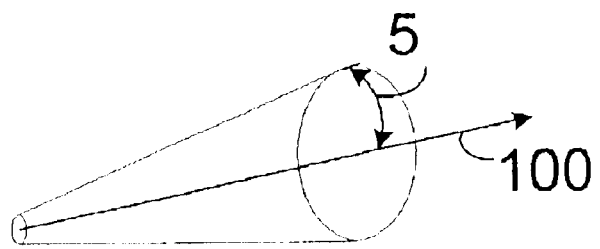
FIG. 4 illustrates a conical light distribution geometry for explanation purposes.

Refer to FIG. 4, the light 100 introduced into the inventive wedge shaped hollow light guide have angular distributions 5 that are symmetric about the central axis, where the axis denotes the preferred propagation direction. This direction is parallel to the sidewalls 30, in the plane of the exit aperture, and runs from the input rectangular aperture towards the distal end of the guide.

Figure 5:
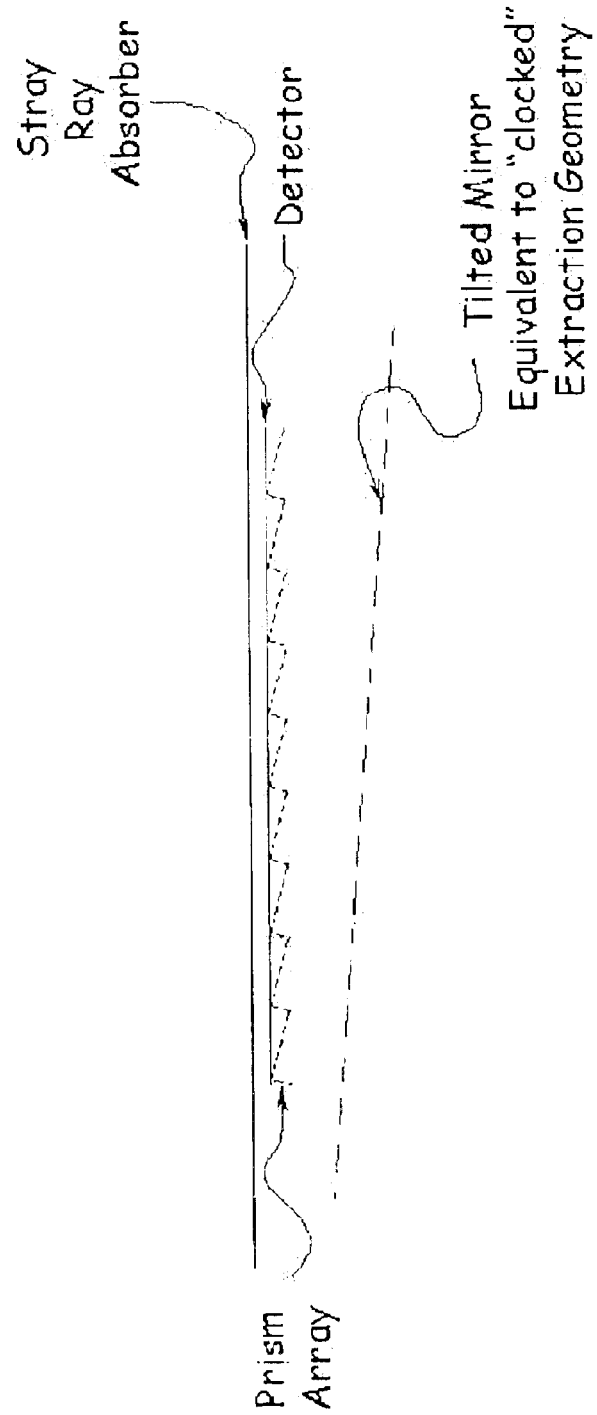
FIG. 5 depicts the simulation model geometry used to verify the optical performance of one illustrative embodiment of my invention
Figure 6:
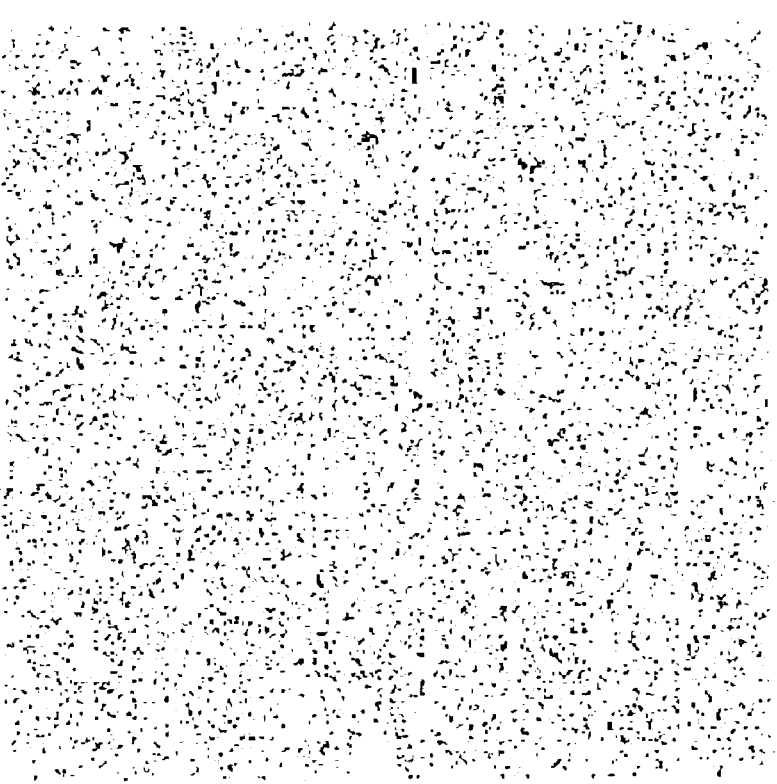
FIG. 6 illustrates a spot position diagram output, showing uniform light distribution, from a simulation run verifying the performance of the embodiment of FIG. 5.

FIGS. 5–13 show various cross-sectional views and optical simulation ray-trace results for the hollow wedge-shaped light guide. FIG. 5 depicts the simulation model geometry used to verify the optical performance of one illustrative embodiment of my invention. FIG. 6 illustrates a spot position diagram output, showing uniform light distribution, from a simulation run verifying the performance of the embodiment of FIG. 5.

Figure 7:
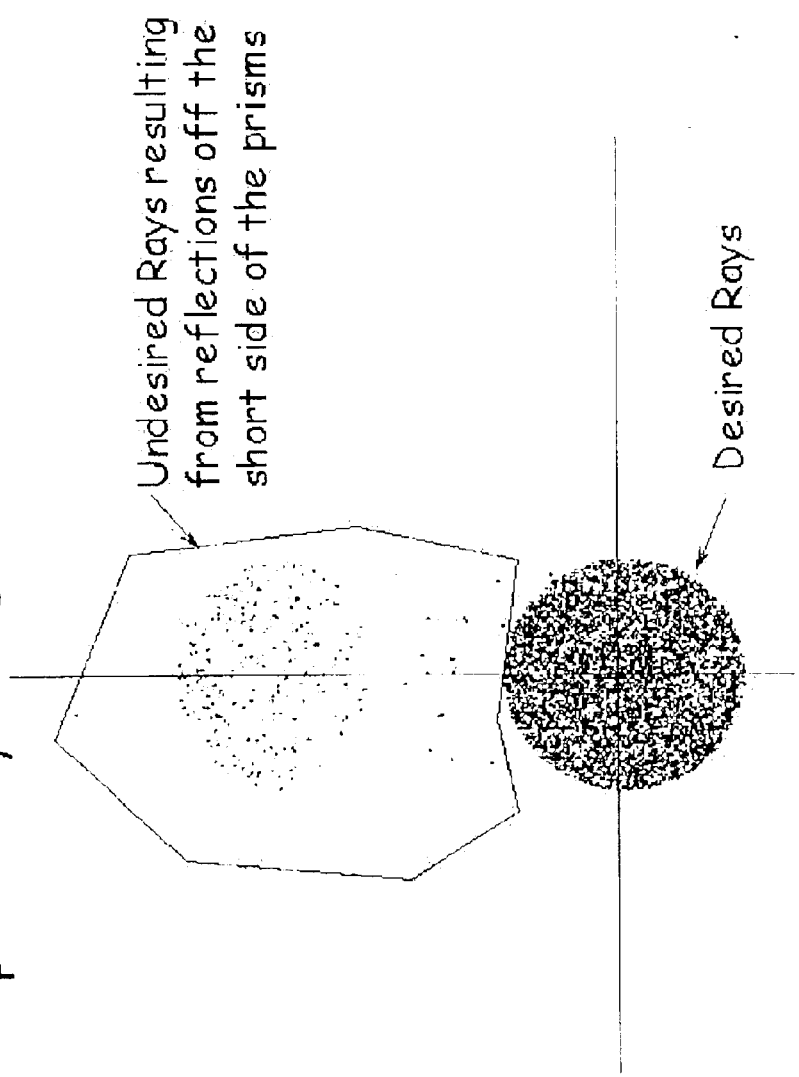
FIG. 7 illustrates a spot direction angular profile output, showing the desired rays and ghost images, from a simulation run verifying the performance of the embodiment of FIG. 5.
Figure 8:
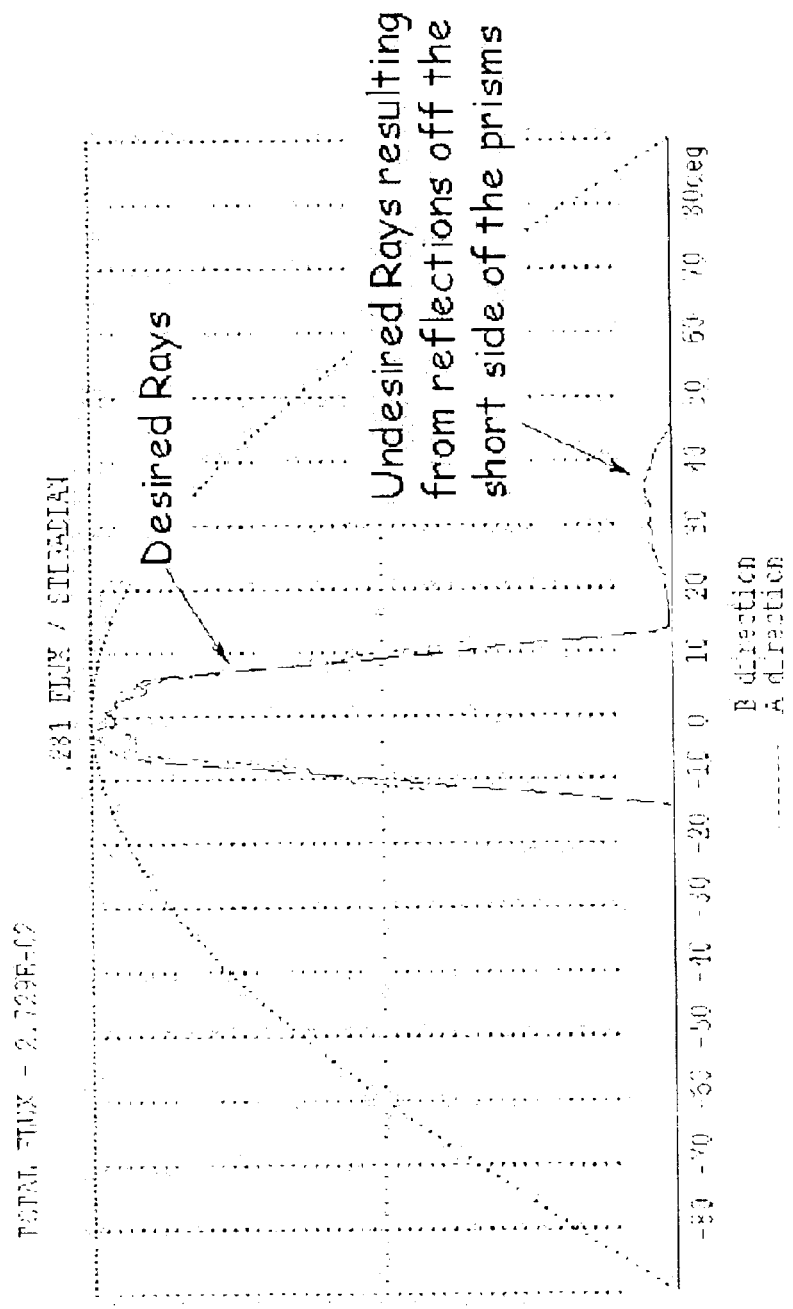
FIG. 8 is a graphical representation of a slice through the spot direction angular profile of FIG. 7.

FIG. 7 illustrates a spot direction angular profile output, showing the desired rays and ghost images, from a simulation run verifying the performance of the embodiment of FIG. 5. FIG. 8 is a graphical representation of a slice through the spot direction angular profile of FIG. 7.

Figure 9:
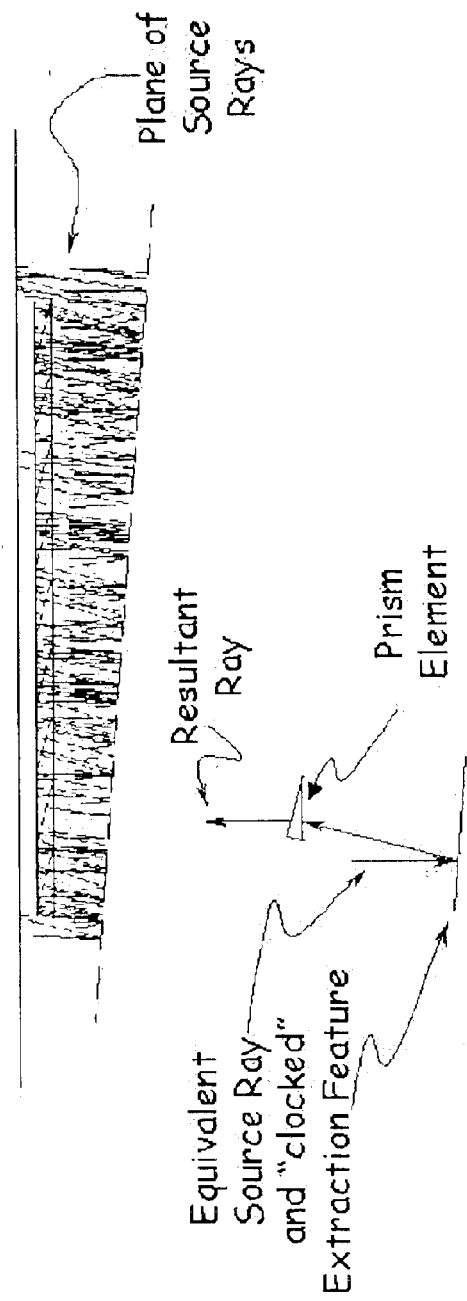
FIG. 9 shows detail of some rays from the simulation ray trace for the light guide of FIG. 5.
Figure 10:
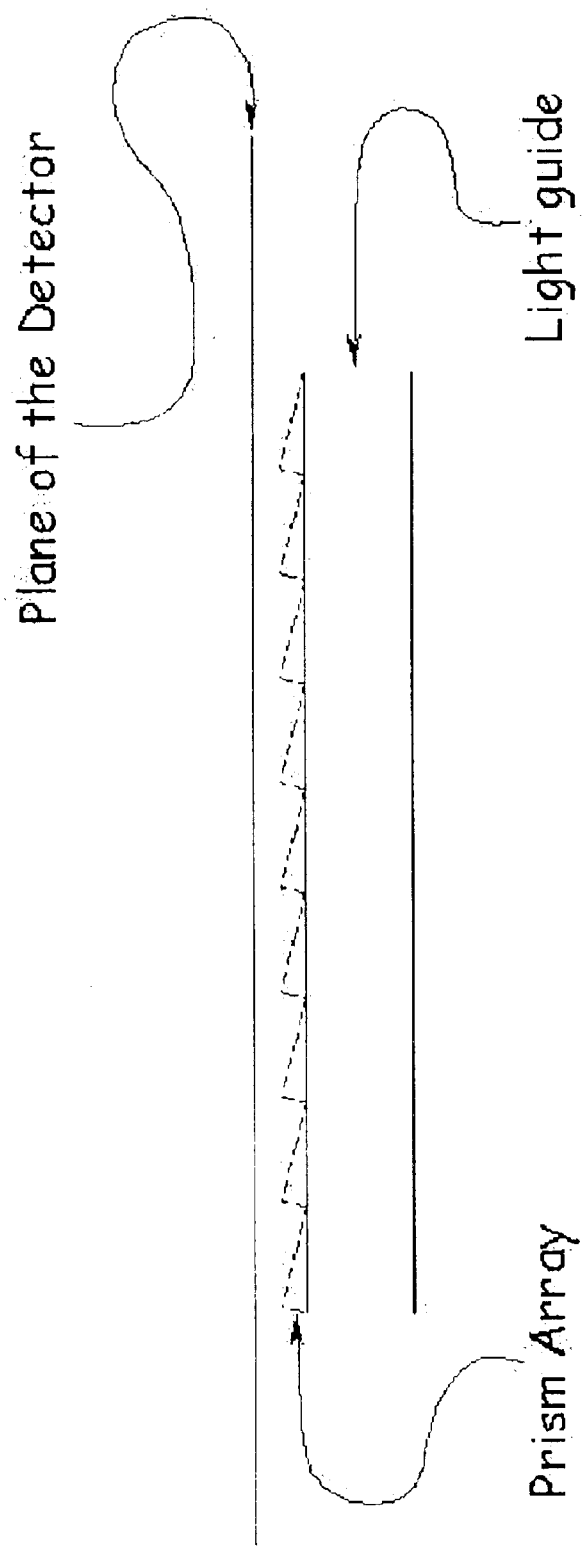
FIG. 10 depicts an additional sectional view of the wedge-shaped light guide of FIG. 5, viewed in the direction of ray propagation.
Figure 11:
FIG. 11 is a detail of a light ray trace, in the direction of ray propagation, for the wedge-shaped light guide of FIG. 5.
Figure 12:
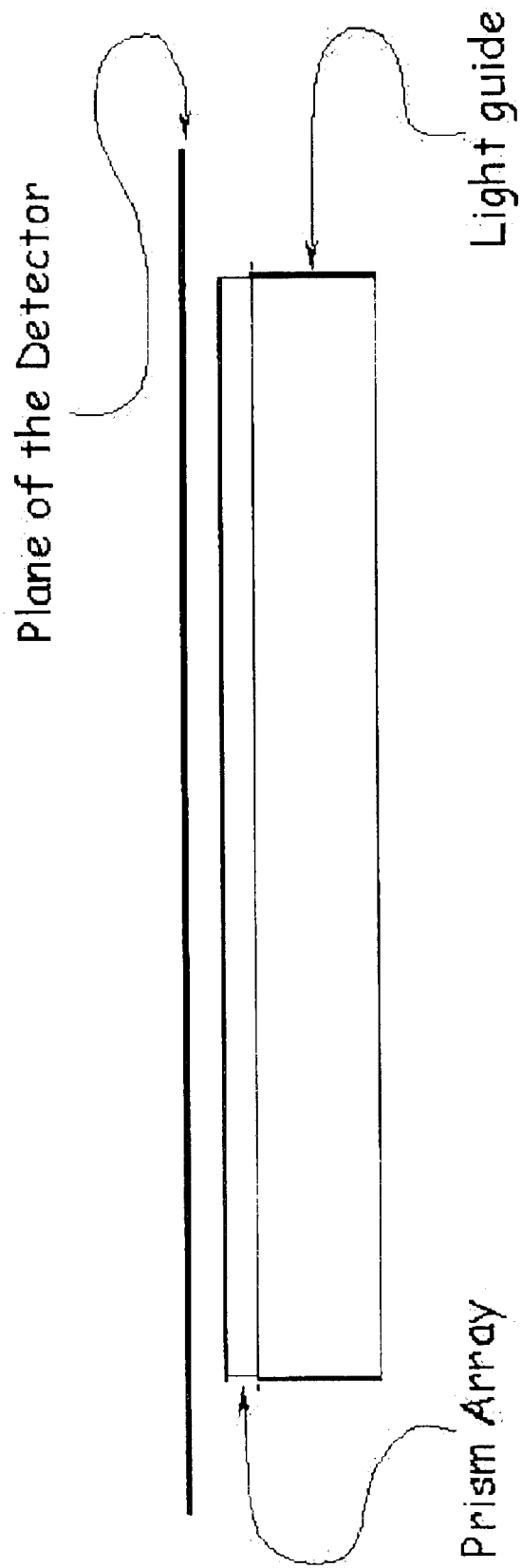
FIG. 12 depicts an additional sectional view of the wedge-shaped light guide of FIG. 5, viewed in the direction normal to the light propagation direction.
Figure 13:
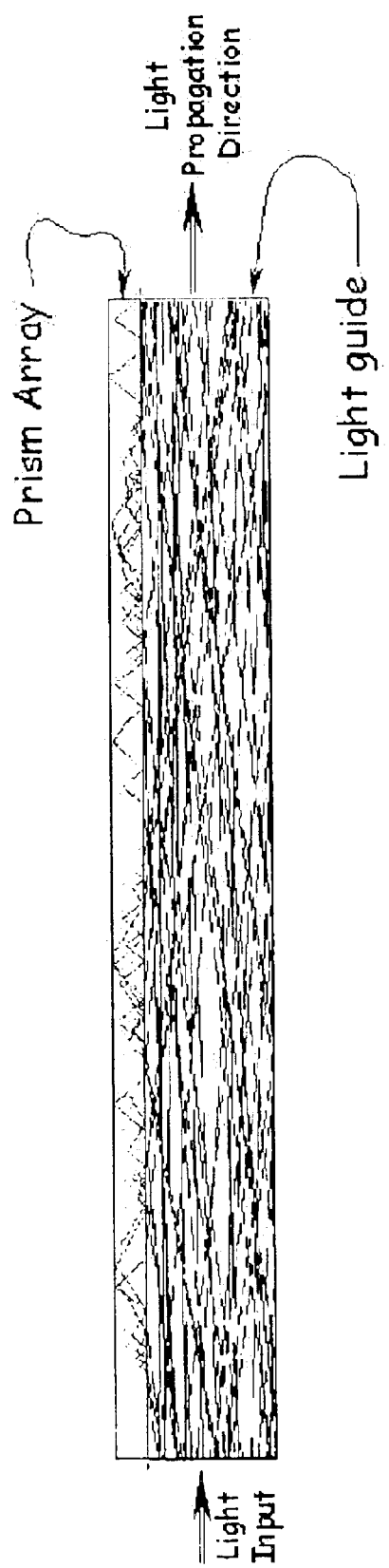
FIG. 13 is a detail of a light ray trace, in the direction normal to the light propagation direction, for the wedge-shaped light guide of FIG. 5.

FIG. 9 shows detail of some rays from the simulation ray trace for the light guide of FIG. 5. FIG. 10 depicts an additional sectional view of the wedge-shaped light guide of FIG. 5, viewed in the direction of ray propagation. FIG. 11 is a detail of a light ray trace, in the direction of ray propagation, for the wedge-shaped light guide of FIG. 5. FIG. 12 depicts an additional sectional view, viewed in the direction normal to the light propagation direction. FIG. 13 is a detail of a light ray trace, in the direction normal to the light propagation direction.

List of Acronyms used in the Specification

The following is a list of the acronyms used in the specification in alphabetical order.

| LCD | liquid crystal display |
| TIR | total internal reflection |

Alternate Embodiments

Alternate embodiments may be devised without departing from the spirit or the scope of the invention. The illumination portion of the invention may be used in a wide variety of applications, including, but not limited to, vehicle lighting, search lights, task lights and projection systems. The display system is utilized in vehicle applications, such as an airplane cockpit, as well as other applications where viewing angles, space, thermal, and/or structural issues are of concern. The wavelengths of light can span on either side of the visible range, as determined by, among other things, material properties and diffraction limits.

What is claimed is:

1. A hollow wedge shaped light guide comprising:
   (a) a rectangular input aperture having parallel opposing top and bottom edges and parallel opposing side edges;
   (b) a transparent top planar sheet orthogonally affixed to the top edge of said rectangular aperture;
   (c) a bottom planar sheet affixed to the bottom edge of said rectangular aperture, wherein said bottom planar sheet slopes toward said top planar sheet, forming a gap between the top planar sheet and the bottom planar sheet that decreases along the length of said light guide;
   (d) wherein said top planar sheet further comprises a top surface having total internal reflecting features thereon, said total reflecting features comprising,
      (i) a plurality of right triangle cross-sections that run for substantially the length of said top planar sheet perpendicular to said top edge of said rectangular aperture; and
   (e) wherein said bottom planar sheet includes reflective light extraction features on one surface,
      (i) said light extraction features including surfaces that are angularly displaced from being parallel to rectangular aperture by a predefined clocking angle.

2. The light guide in claim 1, wherein said right triangles have a surface portion that is substantially less transparent than the bulk material of said top planar sheet.

3. The light guide in claim 1, wherein said reflective light extraction features are selected from the set consisting of sawtooth features, terraced features, and combined sawtooth-terrace features.

4. The light guide in claim 1 further comprising transparent structural elements to support the shape of the guide.

* * * * *